Feb. 19, 1946.    M. W. BARNES    2,395,091
FURNACE STRUCTURE
Filed Sept. 21, 1942
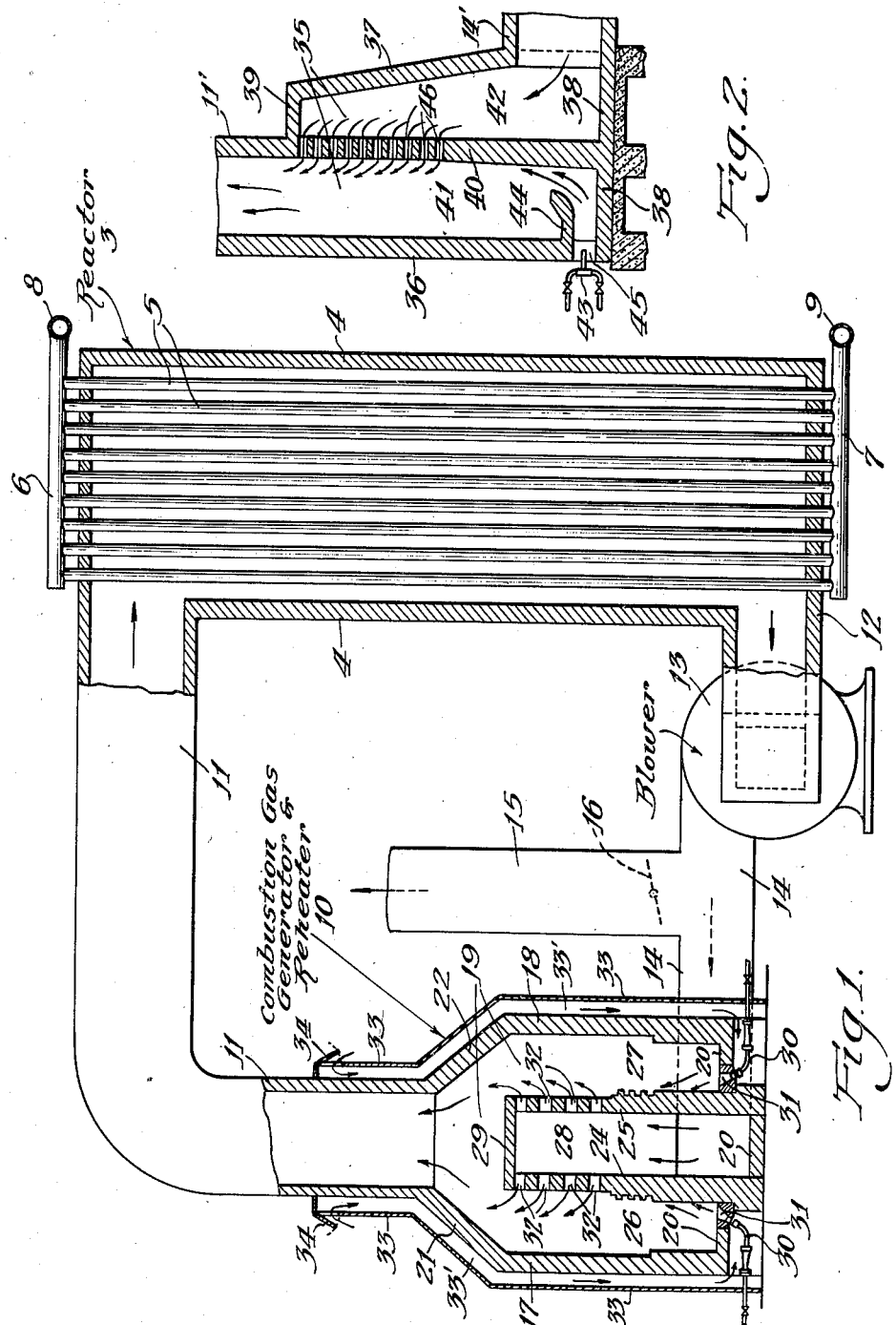
Inventor:
Marion W. Barnes
By: Lee J. Gary
Attorney Patented Feb. 19, 1946

2,395,091

UNITED STATES PATENT OFFICE 2,395,091

FURNACE STRUCTURE

Marion W. Barnes, Chicago, Ill., assignor to Universal Oil Products Company, Chicago, Ill., a corporation of Delaware Application September 21, 1942, Serial No. 459,119

2 Claims. (Cl. 110—49)

The invention is directed to methods and means for heating fluids and particularly to a furnace structure wherein hot combustion gases are generated and intimately mixed with a stream of relatively cool gases passing through the furnace.

Many industrial processes, including those devoted to the catalytic conversion of hydrocarbons for example, employ combustion gases as a convective medium for controlling the temperature of the reaction. To accomplish this it is the common practice to provide a reactor wherein the conversion reaction is conducted at a relatively high temperature and through which the combustion gases employed as the convective medium for supplying heat to the reaction are continuously passed in indirect contact and heat transfer relation with the reactants.

One of the major advantages in the use of combustion gases as the convective fluid is the facility with which the temperature of the circulating stream may be increased exterior to the reactor by commingling freshly generated hotter combustion gases therewith in a portion of the circuit exterior to the reactor. However, the achievement of this advantage has been complicated by the practical problem of devising a simple and efficient method and means whereby the relatively hot, freshly generated combustion gases may be commingled with a relatively large quantity of the cooler recycled gases without stratification in the commingled stream of relatively hot and relatively cold layers and with the avoidance of incomplete or unduly delayed combustion of the fuel from which the fresh combustion gases are derived.

The presence of a large amount of excess air or oxygen in the convective stream of hot combustion gases passing through the reactor is undesirable, due to the tendency of such a stream to rapidly oxidize the metal walls of the reactor or reactor tubes. However, due to the diluting action of the relatively large quantity of gases being recycled, the presence of a large excess of air over that theoretically required for combustion of the added fuel is necessary when an attempt is made to burn the fuel in direct contact with the recirculating gas stream. Without this large excess of air, thermal efficiency is reduced by incomplete combustion of the fuel and combustion of a portion of the fuel is sometimes delayed to such a degree that it takes place in contact with the walls of the reactor causing localized overheating in this zone.

The present invention is particularly addressed to a method and means of overcoming the aforementioned difficulties and represents a simple and advantageous solution to the problem above outlined. However, the apparatus provided by the invention and its mode of operation are advantageously applicable to a wide variety of processes other than that above outlined and the specific illustration herein given is therefore not intended as a limitation.

The features and advantages of the invention will be apparent with reference to the accompanying drawing and the following description thereof.

In the drawing, Fig. 1 diagrammatically illustrates an apparatus embodying the features of the invention and in which the process provided by the invention may be conducted.

Fig. 2 of the drawing is a diagrammtaic sectional elevation of a modified form of combustion gas generator and reheater which may be substituted when desired for that illustrated in Fig. 1.

Referring now particularly to Fig. 1, the apparatus here illustrated comprises a reactor 3 having an outer shell which is lined with or composed of suitable refractory materials such as firebrick or a fireclay composition indicated at 4 and having a nest of elongated metal tubes 5 extending through the shell of the reactor and terminating in top and bottom manifolds indicated respectively at 6 and 7, a number of such banks disposed within reactor shell being connected for the parallel flow of fluid therethrough by means of the top and bottom manifolds which lead to inlet and outlet headers 8 and 9 for the fluid reactants to be converted and for the resulting fluid conversion products. Conversion of the reactants takes place within the tubes 5 and when the reaction is catalytically promoted, a catalyst, not illustrated, is disposed within the tubes.

To supply heat to the reaction taking place within the tubes of reactor 3 and to control the temperature of the reaction, combustion gases are supplied from the combustion gas generator and reheater 10 through duct 11 into the upper portion of the shell of the reactor at the required temperature. The convective gases from duct 11 pass downwardly through the reactor shell about the tubes and are discharged at a reduced temperature from the lower portion of the reactor shell through duct 12 to a suitable fan or blower 13, motivated by any well-known means not illustrated, whereby they are recycled in part through duct 14, combustion gas generator and reheater 10 and duct 11 back to the reactor.

To keep the quantity of gases in the circuit substantially constant, relatively cool gas is discharged therefrom in regulated quantities through duct 15 controlled by damper 16 to a suitable stack, not shown, or elsewhere as desired.

To maintain the desired relatively high temperature in the stream of combustion gases supplied to the reactor, the temperature of the recirculating gas stream is increased to the desired degree as it passes through the furnace structure 10 by burning regulated quantities of a fuel-air mixture in the furnace and commingling the resulting freshly generated hot combustion gases with the circulating stream passing through furnace 10.

The apparatus so far described in conjunction with the drawing and its operation are conventional except for the construction and arrangement of furnace 10 and its mode of operation. No invention is claimed herein for the rest of the system except in combination with a furnace of the improved type provided herein. It will therefore be understood that the invention is not dependent upon any specific construction or operation of the reactor or other portions of the system exterior to the furnace and that the latter and its mode of operation are believed to involve invention per se.

The combustion gas generator and reheater, or furnace 10, comprises, in the case illustrated in Fig. 1, refractory side walls 17 and 18, refractory end walls, one of which is indicated at 19, a refractory floor 20, and sloping refractory side walls 21 and 22 extending between the end walls and connecting the upper portion of walls 17 and 18 with duct 11 leading to reactor 3.

That portion of the interior of the furnace beneath the upper extremity of the substantially vertical side walls 17 and 18 is divided by the spaced substantially vertical refractory walls 24 and 25 into a zone 26 disposed between walls 17 and 24, a zone 27 disposed between walls 18 and 25, and a zone 28 disposed between walls 24 and 25. Zone 28 is closed at its upper end as indicated at 29 and the lower portion of this zone communicates with duct 14 wherethrough the relatively cool gases to be reheated in the furnace are supplied thereto.

The lower portion of the spaces 26 and 27 comprise combustion zones to which fuel and air for effecting combustion are supplied through burners 30 and firing ports 31 provided in the floor 20 adjacent the outer surface of each of the refractory walls 24 and 25. Preferably a row of burners and burner ports is provided along the base of each and the walls 24 and 25 and flames of hot combustion gases issuing therefrom are directed upwardly over and in intimate contact with these walls thereby heating them to a relatively high temperature and assisting complete combustion of the fuel within the combustion zones.

Preferably, as in the case illustrated in Figure 1, the furnace structure is encased in a suitable housing 33 formed of suitable material, such as sheet metal, asbestos millboard or sheet metal lined with suitable insulation, such as asbestos millboard. The housing is supported on a suitable metal framework, not illustrated, from which refractory shapes forming the outer refractory walls of the heater may also be suspended, when desired. The housing is spaced from the refractory walls of the furnace and provides a passageway 33' therebetween to which air for combustion is admitted at the upper end in amounts regulated by dampers 34. The air passes downwardly through the space 33' between the housing and the refractory walls of the furnace and is preheated in transit by heat transmitted through the refractory walls. The preheated air is admitted, in part, through the burners and, in part, directly through the firing ports to the combustion zones 26 and 27.

The upper portion of walls 24 and 25 are provided with a plurality of openings 32 therethrough, forming a checkerwork structure over which the freshly generated hot combustion gases pass and through which openings the cooler combustion gases from zone 28 pass to commingle with the freshly generated hot combustion gases.

By passing the combustion gases from zone 28 through the heated checkerwork before they are commingled with the freshly generated hotter combustion gases, the streams of relatively hot and relatively cold gases are commingled at more nearly the same temperature than would otherwise be obtained, and there is therefore less tendency for stratification of relatively hot and relatively cold gases in the stream passing from furnace 10 to reactor 3.

By providing adequate combustion space for the fuel-air mixture from burners 30 in the lower portion of zones 26 and 27, substantially complete combustion of the fuel is obtainable with considerably less excess air than would be required if the burners discharged the fuel-air mixture directly into the mass of cooler gases being recycled through the furnace. Thus, the relatively simple furnace structure herein provided and the mode of operation which it permits avoid the aforementioned difficulties which have heretofore been encountered in this type of system.

Referring now to Fig. 2, the modified form of furnace structure here illustrated may be substituted for the form shown in Fig. 1, but is not to be considered the full equivalent thereof. It comprises substantially vertical refractory end walls, one of which is indicated at 35, refractory side walls 36 and 37, a refractory floor 38, a refractory roof 39 over a portion of the structure, and a substantially vertical refractory partition wall 40 which divides the space between walls 36 and 37 into the vertically elongated zones 41 and 42.

Ducts 11' and 14' of Fig. 2 correspond respectively to ducts 11 and 14 of Fig. 1, recirculated combustion gases being supplied through duct 14' to zone 42, and a mixture of freshly generated and recycled combustion gases being discharged from the furnace through duct 11'.

The lower portion of zone 41 comprises a combustion chamber to which combustible fuel and air are supplied by a row of burners, one of which is indicated at 43. A refractory baffle or false floor 44, positioned adjacent and above the firing ports 45 and extending from wall 36 to adjacent wall 40, directs the flames issuing from the burners upwardly over and in intimate contact with the surface of wall 40 in zone 41.

Openings 46 are provided through the upper portion of wall 40, through which recirculated combustion gases from zone 42 pass into the upper region of zone 41, wherein they mix with the freshly generated hotter combustion gases from the combustion zone, the mixture passing from the furnace through duct 11'.

Sufficient space is provided in zone 41 beneath the perforations in wall 40 so that substantially complete combustion of the fuel supplied by burners 43 is accomplished therein with the admission of only a relatively small amount of excess air to the combustion zone. Intimate contact of the flames and hot combustion gases with the refractory surface of wall 40 over which they are directed, serves to heat this wall to a high temperature and to facilitate combustion of the fuel.

Some heat is transmitted through wall 40 from zone 41 to the relatively cool recycled gases passing through zone 42. Also the recycled gases passing from zone 42 through the checkerwork in wall 40 into zone 41 are further heated by contact with the hot refractory surfaces surrounding openings 46 and over which the hotter combustion gases from the combustion zone are passed. Thus the recycled gases enter zone 41 at a considerably higher temperature than that at which they are supplied to zone 42, and commingle with the freshly generated combustion gases at more nearly the temperature of the latter than would otherwise be the case. This and introduction of the recycled gases into the stream of freshly generated combustion gases in relatively small increments at a plurality of points along the path of flow of the latter, as provided by the invention, greatly reduces or eliminates any tendency for relatively hot and relatively cold gases to stratify in the commingled stream leaving the furnace. It will thus be apparent that the furnace structure illustrated in Fig. 2, like that shown in Fig. 1, obviates the aforementioned difficulties heretofore encountered in tempering a large circulating stream of combustion gases by the addition thereto of freshly generated hotter combustion gases.

The furnace structure illustrated in Fig. 1, has advantages over that illustrated in Figure 2 for large capacity installations and in situations where headroom is an important factor. On the other hand, the structure of Figure 2 has the advantage of somewhat lower cost and is desirable where ground space is an important factor.

I claim as my invention:

1. A furnace structure comprising substantially vertical refractory side and end walls, a substantially vertical refractory partition wall disposed between and spaced from said side walls to define a combustion and mixing chamber on one side of said partition and a distributing chamber on the opposite side thereof, a port being provided in one of said walls for the introduction of gases from exterior the furnace directly into said distributing chamber, burner means disposed at one end of said combustion and mixing chamber for introducing combustible fuel and air into the combustion zone and for directing resulting flames and hot combustion gases vertically over the surface of said partition wall and through the mixing zone, spaced openings being provided through said partition wall along the path of flow of said hot gases through the mixing zone to establish communication between the distributing chamber and the mixing zone, and an outlet opening for discharging commingled gases from the mixing chamber being provided in the furnace structure along said path of flow beyond said openings in the partition wall.

2. A furnace structure comprising substantially vertical refractory side and end walls, substantially vertical partition walls disposed between said side walls and spaced from each other to define a separate chamber adjacent each of said side walls and an intermediate chamber between said partition walls, said intermediate chamber communicating with each of the first named chambers through spaced openings provodided in said partition walls adjacent one end thereof, burner means disposed adjacent that end of each of the first named chambers remote from said openings in the partition walls for directing flames and hot combustion gases vertically through the first named chambers over the surface of each of said partition walls, means for introducing gases from exterior the furnace structure into said intermediate chamber and therefrom through said openings into each of the first named chambers, and means for discharging commingled gases from each of the first named chambers at that end thereof most remote from said burner means.

MARION W. BARNES.